United States Patent
Buschjohann et al.

(10) Patent No.: US 7,938,414 B2
(45) Date of Patent: May 10, 2011

(54) AUXILIARY FRAME, PARTICULARLY FOR MOTOR VEHICLES

(75) Inventors: Thomas Buschjohann, Nordstemmen (DE); Heiko Kauert, Ludwigsfelde (DE)

(73) Assignees: KSM Castings GmbH, Hildesheim (DE); IAMT Ingenieurgesellschaft für Allgemeine Maschinentechnik mbH, Plauen (DE)

( * ) Notice: Subject to any disclaimer, the term of this patent is extended or adjusted under 35 U.S.C. 154(b) by 406 days.

(21) Appl. No.: 11/990,312

(22) PCT Filed: Sep. 8, 2006

(86) PCT No.: PCT/DE2006/001581
§ 371 (c)(1),
(2), (4) Date: Feb. 11, 2008

(87) PCT Pub. No.: WO2007/031059
PCT Pub. Date: Mar. 22, 2007

(65) Prior Publication Data
US 2010/0133800 A1    Jun. 3, 2010

(30) Foreign Application Priority Data
Sep. 13, 2005   (DE) .......................... 10 2005 043 764

(51) Int. Cl.
*B62D 21/00* (2006.01)
*B60G 3/18* (2006.01)
*B60G 3/20* (2006.01)

(52) U.S. Cl. ... 280/124.109; 280/124.128; 280/124.134; 280/124.135; 280/781

(58) Field of Classification Search .................. 180/311, 180/312; 280/124.109, 788, 798, 800, 124.134, 280/124.135, 124.128; 296/204
See application file for complete search history.

(56) References Cited

U.S. PATENT DOCUMENTS

| | | | | |
|---|---|---|---|---|
| 4,429,900 A | * | 2/1984 | Feher | 280/124.128 |
| 4,671,531 A | * | 6/1987 | Sautter et al. | 280/124.109 |
| 4,815,556 A | * | 3/1989 | Sumimoto et al. | 180/311 |
| 5,280,957 A | * | 1/1994 | Hentschel et al. | 280/788 |
| 6,378,268 B1 | * | 4/2002 | Guyomard | 280/800 |
| 6,623,020 B1 | | 9/2003 | Satou | |

(Continued)

FOREIGN PATENT DOCUMENTS

DE    39 27 987    2/1991

(Continued)

OTHER PUBLICATIONS

International Search Report.

*Primary Examiner* — Eric Culbreth
*Assistant Examiner* — Joseph Rocca
(74) *Attorney, Agent, or Firm* — Collard & Roe, P.C.

(57) ABSTRACT

The invention relates to an auxiliary frame (1) for multi-link rear axles of motor vehicles, comprising two lateral auxiliary frame parts (B) which are embodied at least approximately in a V-shaped manner in such an arrangement that the vertexes (6, 7) thereof face each other and are joined to each other via a central auxiliary frame part (C) that extends perpendicular to the longitudinal axis of the vehicle. The lateral auxiliary frame parts and the central auxiliary frame part are configured as hollow profiled members while the lateral auxiliary frame parts are provided with at least three of the following receptacles or recesses: the top transverse link; the bottom transverse link; the stabilizer; the longitudinal links; the fixture of the auxiliary frame to the vehicle body.

16 Claims, 4 Drawing Sheets

Figure 1:
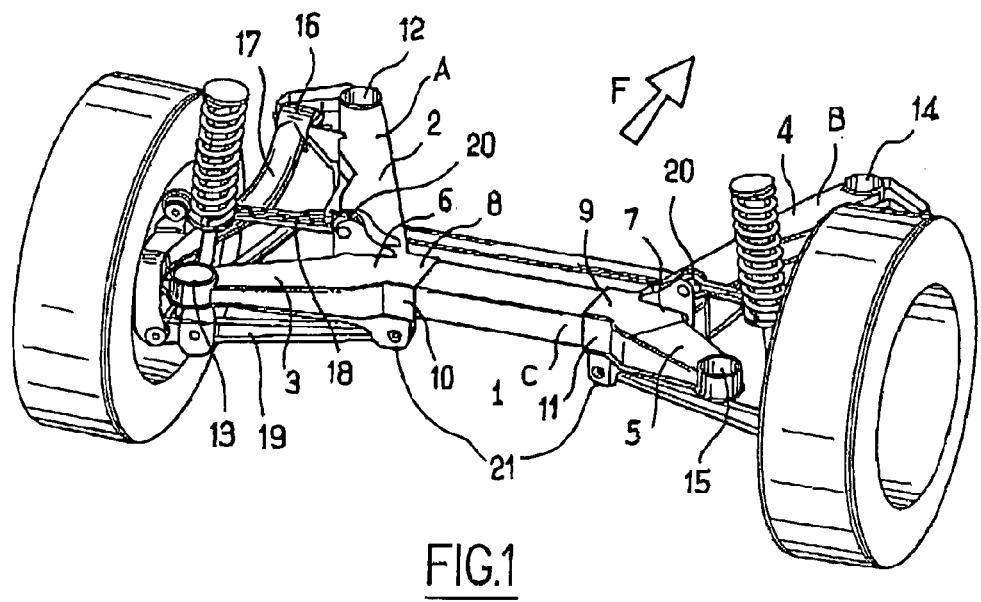

U.S. PATENT DOCUMENTS 6,648,351 B1 * 11/2003 Kosak .................. 280/124.109
6,755,429 B1    6/2004 Buchwitz et al.

FOREIGN PATENT DOCUMENTS

| DE | 43 43 841 | 6/1995 |
| DE | 100 52 940 | 5/2001 |
| DE | 203 19 147 | 4/2004 |
| JP | 61-200014 | 9/1986 |
| JP | 63-067439 | 3/1988 |
| JP | 2-106974 | 8/1990 |
| JP | 02-299744 | 12/1990 |
| JP | 09-193633 | 7/1997 |
| JP | 11-222152 | 8/1999 |
| JP | 2001-073056 | 3/2001 |
| JP | 2001-271861 | 10/2001 |
| JP | 2002-166714 | 6/2002 |
| JP | 2003-034112 | 2/2003 |
| JP | 2005-059813 | 3/2005 |

* cited by examiner

AUXILIARY FRAME, PARTICULARLY FOR MOTOR VEHICLES

CROSS REFERENCE TO RELATED APPLICATIONS

Applicants claim priority under 35 U.S.C. §119 of German Application No. 10 2005 043 764.8 filed Sep. 13, 2005. Applicants also claim priority under 35 U.S.C. §365 of PCT/DE2006/001581 filed Sep. 8, 2006. The international application under PCT article 21(2) was not published in English.

The invention relates to an auxiliary frame, more preferably a rear axle auxiliary frame for motor vehicles with multi-link rear axles.

Such multi-link rear axles in themselves offer optimal possibilities for deliberately influencing the wheel control and the driving characteristics in a wide range of driving situations. Here, the links and also other elements of a vehicle are generally preassembled into a unit on an auxiliary frame, also described as bogie or axle support and these fastened to body regions or the chassis.

However, the rear axles known to date embodied in this way frequently have the disadvantage of very high manufacturing effort and are consequently cost-intensive.

The present invention was based on the object of manufacturing such rear axles, faster, simpler and thus more cost-effectively and to expand the possible applications, which because of the higher quantities involved, in turn results in lower-priced products.

In addition, costs are to be further reduced, accuracy increased and quality improved through the use of advanced and cost-effective casting technologies as well as optimal materials.

According to the invention this is achieved in that an auxiliary frame, more preferably a rear axle auxiliary frame, is equipped in such a manner that it consists of two lateral auxiliary frame parts which are embodied at least approximately in a V-shaped manner in such an arrangement that the vertexes thereof face each other and are joined to each other via a central auxiliary frame part that extends perpendicular to the longitudinal axis of the vehicle, the lateral auxiliary frame parts and the central auxiliary frame part are configured as hollow profiled members and the lateral auxiliary frame parts comprise at least three of the following receptacles or recesses for

- the top transverse links
- the bottom transverse links
- the stabilizer
- the longitudinal links
- the fixture of the auxiliary frame to the vehicle body.

This can be particularly advantageous if the V-shaped lateral auxiliary frame parts comprise a U-shaped cross section with reinforcement ribs running between the legs.

The V-shaped lateral parts in their vertex region can have the foot of a Y moulded on with a cross section corresponding to the central auxiliary frame part, wherein the central auxiliary frame part can be accommodated in the vertex regions or the foot region of the Y. A square hollow profiled member, which can be an extruded profile, can be suitable as profile for the central auxiliary frame part in a particularly advantageous manner.

When using central auxiliary frame parts of different lengths, vehicles with different track width can be equipped with uniform lateral auxiliary frame parts which, because of the quantities employed, substantially favours economical manufacture.

It is furthermore advantageous if the lateral auxiliary frame parts and/or the central auxiliary frame part consist of light metal, wherein Al-alloys are particularly suitable. Here, the lateral auxiliary frame parts can be die-castings and the central auxiliary frame part, as already mentioned, an extruded profile. Such parts can be connected with each other also in a relatively simple manner through welding.

The recesses for the fastening of the auxiliary frame to the body or for passing-through of fastening elements in this case are each practically provided at the end of the legs of the lateral auxiliary frame parts.

A further inventive idea relates to a particular embodiment of a longitudinal link which can be used both in connection with an auxiliary frame of the kind described as well as with rear axles embodied in a different manner. Said longitudinal link is characterized in that said longitudinal link in its region between an articulation point on the auxiliary frame and its wheel support region moulded onto its other end as one piece is a hollow profiled member. Here, the hollow profiled member can be a closed profile for example a round profile, which preferentially consists of light metal, for example of an Al-alloy.

It is particularly advantageous with regard to the achievement of great stiffness if the longitudinal link in its region between fastening point on the auxiliary frame and its wheel support region additionally contains a hollow body, while it can be advantageous with regard to the achievement of light-weight construction, if the longitudinal link is an Al-chill casting, in which the additional hollow body is cast-in.

The invention is explained in more detail by means of the FIGS. 1 to 7.

Here, FIG. 1 shows a rear axle with an auxiliary frame 1 and axle elements fastened thereto on the example of a non-powered rear axle.

Figure 2:
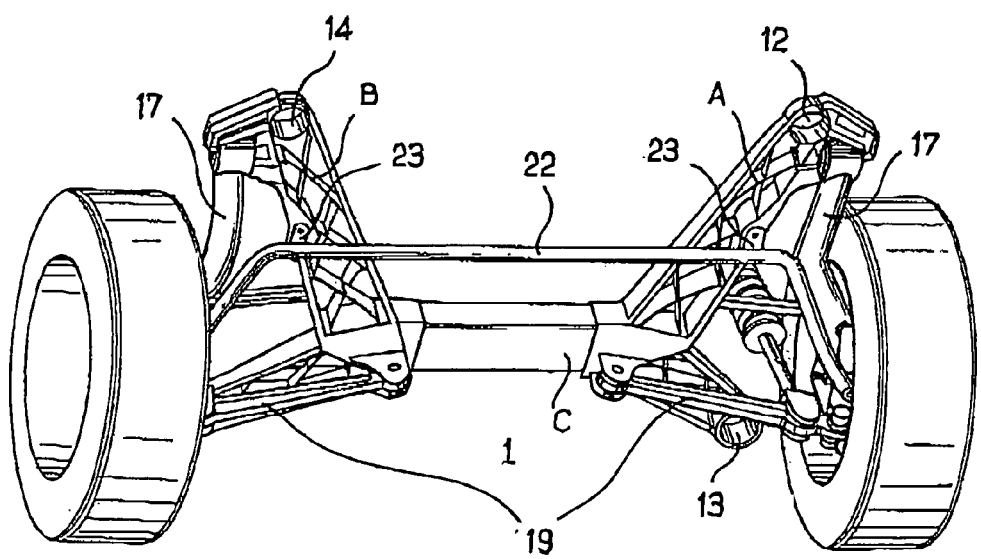
Figure 3:
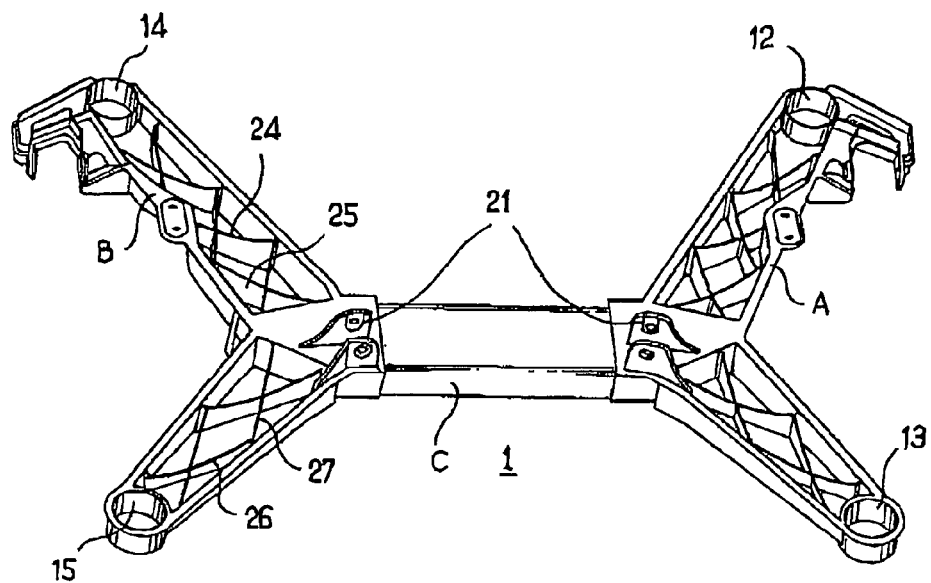
Figure 4:
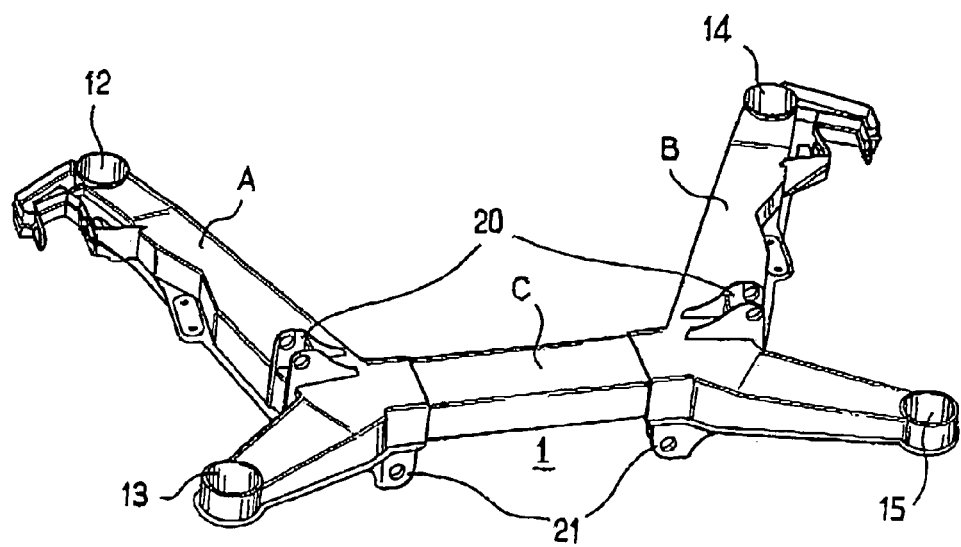

FIG. 2 shows a view from FIG. 1 swiveled about the axes XYZ,

FIG. 3 the auxiliary frame 1 from a perspective corresponding to FIG. 2, FIG. 4 a view of the auxiliary frame 1 from a similar view as FIG. 1.

Figure 5:
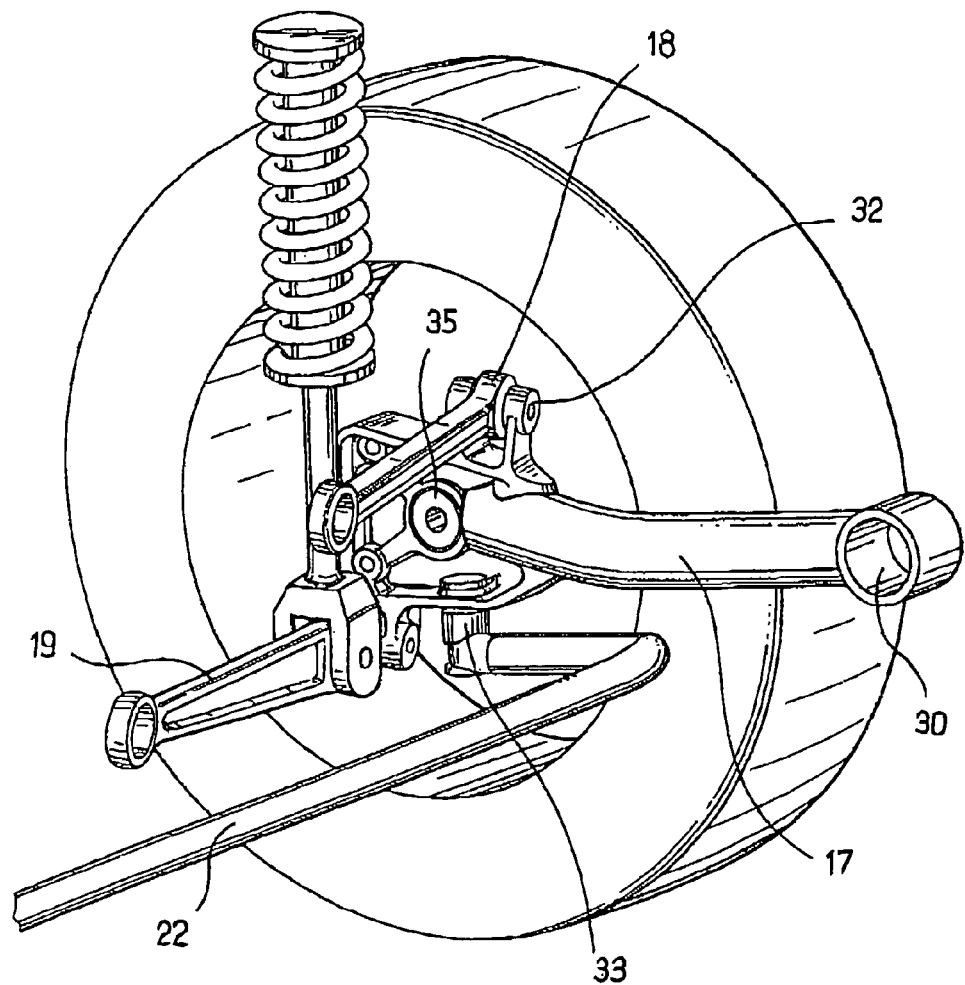
Figure 6:
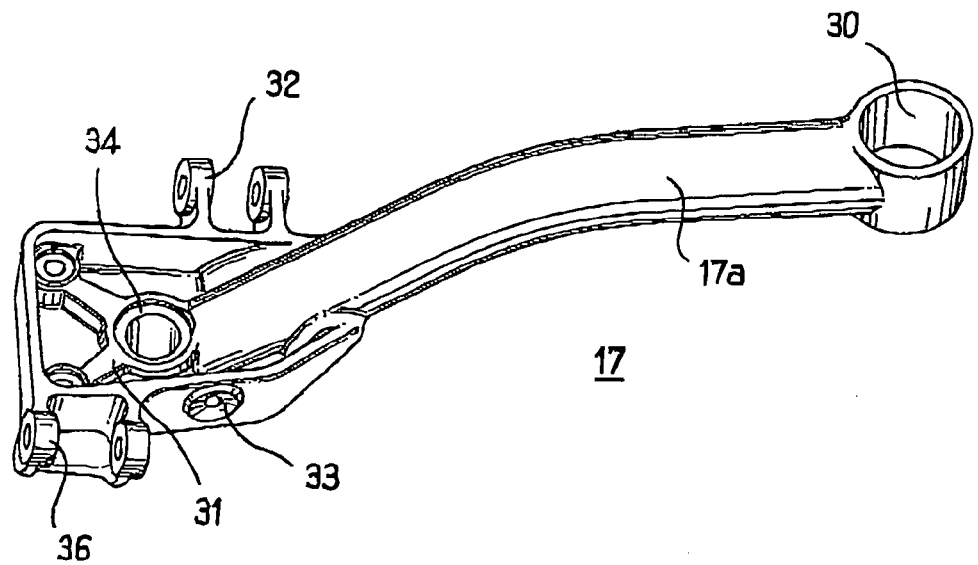
Figure 7:
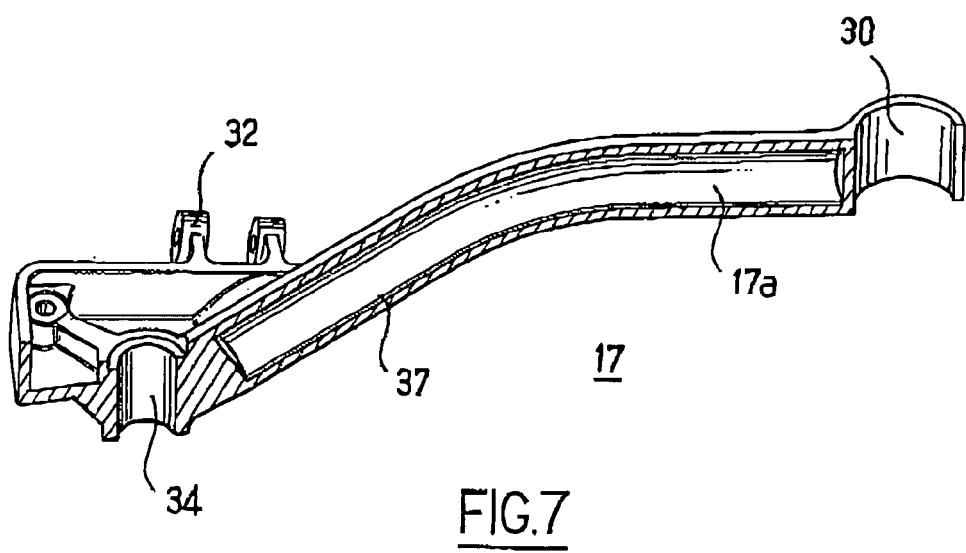

FIGS. 5 to 7 show a special longitudinal link according to a further inventive idea, wherein FIG. 5 shows the longitudinal link in the installed state, FIG. 6 one such in view and FIG. 7 one such in the cut state.

The auxiliary frame 1, with view of FIG. 1 and in the driving direction F, consists of a left lateral auxiliary frame part A and a right lateral auxiliary frame part B. Each of the lateral parts is embodied in at least an approximately V-shaped manner with legs 2, 3 as well as 4, 5. The two legs each meet in their vertex region 6, 7 and additionally have a foot shoulder 8, 9 and thus altogether an at least approximately Y-shaped embodiment. The foot shoulders face in the direction of the vehicle longitudinal axis, i.e. towards each other and have the profiling of a rectangle 10, 11 in which the central auxiliary frame part C is accommodated and welded together with the profiles 8, 9.

At the ends of the V-shaped legs the fastening points or the receptacles for the passing-through of fastening means for the articulation of the auxiliary frame to the body or the chassis of the vehicle are provided, specifically the left lateral auxiliary frame part A has a fastening point 12, a rear fastening point 13 and the right lateral auxiliary frame part B a front fastening point 14 and a rear fastening point 15. In addition, the auxiliary frame has receptacle points for the fastening of parts of the rear axle which for the sake of simplification are provided with the same reference symbols each for the right and the left lateral part and in part are also shown only once, since it practically concerns mirror-image arrangements.

The longitudinal link 17 is articulated on the fastening point 16, the top and bottom transverse links 18, 19 are articulated on the fastening points 20, 21.

For the stabiliser 22, as is more preferably evident in connection with FIGS. 2 and 3, fastening points 23 are provided on the bottom region of the lateral auxiliary frame parts.

As is more preferably evident in connection with FIGS. 2 and 3 the lateral auxiliary frame parts have a U-shaped cross section with reinforcement ribs 24, 25 and 26, 27 which at least substantially run between the U-shaped legs of the lateral parts. In a particularly favourable manner the lateral auxiliary frame parts A, B can consists of aluminum die-casting while the central auxiliary frame part C is practically a rectangular hollow profiled member that can be manufactured as aluminum extruded profile.

By varying the length of the central auxiliary frame part C rear axles with different track width can be created in a particularly economical manner.

To realise an economical rear axle more preferably, however not exclusively, in connection with the present invention a longitudinal link 17 according to FIGS. 5, 6 and 7 can also be suitable according to a further inventive idea, which longitudinal link with its eye 30 can be articulated on the fastening point 16 and which, on its opposite end, has the wheel support region 31 moulded on as one piece. The region 32 serves for the articulation of the top transverse link 18 and the articulation point 33 for the articulation of the stabilizer 22. In a receptacle opening 34 a steel axle pin 35 for receiving the wheel bearing is provided. A fastening point 36 serves for the articulation of the transverse link 19.

The longitudinal link 17 with its wheel support region 31 moulded on as one piece can be manufactured in a particularly favourable manner as an aluminum chill casting, which, in its region 17a located between the fastenings points 30 and 34, contains an aluminum tube that is cast in. As a result, the corresponding longitudinal link is embodied as hollow profiled member for great stiffness with low mass and low costs at the same time.

The invention claimed is:

1. An auxiliary frame for a vehicle, comprising:
   two lateral auxiliary frame parts that are each embodied in a substantially V-shaped configuration having a vertex;
   a single central auxiliary frame part that extends perpendicular to the longitudinal axis of the vehicle, said central auxiliary frame part having a first end and a second end;
   wherein each of the two respective lateral auxiliary frame parts include a first leg that extends from a first side of the respective vertex and forms a first side of the substantially V-shaped configuration and a second leg that extends from an opposite side of the respective vertex and forms a second side of the substantially V-shaped configuration;
   wherein the vertex of one of the two respective lateral auxiliary frame parts is joined to the first end of the central auxiliary frame part and the vertex of other of the two respective lateral auxiliary frame parts is joined to the second end of the central auxiliary frame part, in such an arrangement that the vertexes thereof face each other and are joined to each other via the central auxiliary frame part;
   wherein each of the first legs extends diagonally away from the vertex to a respective end;
   wherein each of the second legs extends diagonally away from the vertex to a respective end, the respective ends of each of the second legs being opposite the direction of the respective ends of each of the first legs, with respect to a longitudinal direction of the vehicle;
   wherein each end of the respective first and second legs comprises a fastener for fixing the auxiliary frame to a vehicle body;
   wherein each of the first legs include a longitudinal link attached thereto via a recess or receptacle;
   wherein a stabilizer bar is connected to each of the first legs via a recess or receptacle;
   wherein top transverse links and/or bottom transverse links are connected at the respective vertexes via respective recesses or receptacles.

2. The auxiliary frame according to claim 1, wherein the V-shaped lateral auxiliary frame parts have a U-shaped cross section with reinforcement ribs running between the legs.

3. The auxiliary frame according to claim 1, wherein the V-shaped lateral parts in the vertex region have the foot of a Y moulded on with a cross section corresponding to the central auxiliary frame part.

4. The auxiliary frame according to claim 3, wherein the central auxiliary frame part is accommodated in the vertex regions and the foot region of the Y respectively.

5. The auxiliary frame according to claim 3, wherein the V and Y-shaped lateral auxiliary frame parts respectively and the central auxiliary frame member are welded to each other.

6. The auxiliary frame according to claim 1, wherein the central auxiliary frame part is a square hollow profiled member.

7. The auxiliary frame according to claim 1, wherein the lateral auxiliary frame parts and/or the central auxiliary frame part comprise light metal.

8. The auxiliary frame according to claim 7, wherein the light metal is an Al-alloy.

9. The auxiliary frame according to claim 1, wherein the lateral auxiliary frame parts are die-castings.

10. The auxiliary frame according to claim 1, wherein the central auxiliary frame part is an extruded profile.

11. The auxiliary frame according to claim 1, wherein each longitudinal link comprises:
    an articulation point at a first end of the longitudinal link;
    a wheel support region moulded onto a second end of the longitudinal link as one piece, the second end being opposite to the first end; and
    a hollow profiled member in a region between the first end and the second end.

12. The auxiliary frame according to claim 11, wherein the hollow profiled member is a closed profile.

13. The auxiliary frame according to claim 11, wherein the hollowed profile member comprises a hollow body.

14. The auxiliary frame according to claim 13, wherein the hollow body is cast in the longitudinal link.

15. The auxiliary frame according to claim 14, wherein the hollow body is an Al-hollow body.

16. The auxiliary frame according to claim 11, wherein the longitudinal link is an aluminum chill casting.

* * * * *